US00RE49550E

(19) United States
(12) Reissued Patent
Gunns

(10) Patent Number: US RE49,550 E
(45) Date of Reissued Patent: Jun. 13, 2023

(54) AUXILIARY SHOT CLOCK

(71) Applicant: Eddie Gunns, Killeen, TX (US)

(72) Inventor: Eddie Gunns, Killeen, TX (US)

(21) Appl. No.: 17/037,645

(22) Filed: Sep. 29, 2020

Related U.S. Patent Documents

Reissue of:
(64) Patent No.: 10,099,106
Issued: Oct. 16, 2018
Appl. No.: 15/812,066
Filed: Nov. 14, 2017

(51) Int. Cl.

| | |
|---|---|
| ***A63B 69/00*** | (2006.01) |
| ***A63B 71/06*** | (2006.01) |
| ***G07C 1/28*** | (2006.01) |
| ***A63B 63/08*** | (2006.01) |
| ***G07C 1/22*** | (2006.01) |

(52) U.S. Cl.
CPC ..... *A63B 71/0686* (2013.01); *A63B 63/083* (2013.01); *A63B 71/0669* (2013.01); *G07C 1/22* (2013.01); *G07C 1/28* (2013.01); *A63B 2220/17* (2013.01); *A63B 2220/62* (2013.01); *A63B 2220/833* (2013.01)

(58) Field of Classification Search
CPC ..... A63B 71/0686; A63B 63/083; A63B 71/0669; A63B 2220/17; A63B 2220/62; A63B 220/833; G07C 1/28
See application file for complete search history.

(56) References Cited

U.S. PATENT DOCUMENTS 4,045,788 A * 8/1977 Castelli ..... A63B 71/06 340/309.2
D265,892 S 8/1982 Gebhardt
4,637,732 A * 1/1987 Jones ..... G04C 10/04 340/309.16
5,341,121 A 8/1994 Rada
5,480,147 A * 1/1996 Ethier ..... A63B 71/0669 473/472
6,144,620 A * 11/2000 dePoortere ..... G04G 21/025 368/108
6,369,697 B1 * 4/2002 Poole ..... G07C 1/28 340/12.54
D466,826 S * 12/2002 Takata ..... D10/125
6,603,711 B2 * 8/2003 Calace ..... A63B 71/0605 368/10

(Continued)

FOREIGN PATENT DOCUMENTS

WO 2004086311 A 10/2004

*Primary Examiner* — Deandra M Hughes
(74) *Attorney, Agent, or Firm* — Maxwell L. Minch; Maxwell L Minch Esq. PA

(57) ABSTRACT

The auxiliary shot clock is used during a basketball game. The auxiliary shot clock is a timing device that: 1) operates a five-second timing device that detects a five-second violation for an inbound pass; 2) operates a ten-second timing device that detects a half court violation after an inbound pass; 3) displays the time of the five-second timing device; 4) displays the time of the ten-second timing device; 5) generates an alarm signal on expiration of the five-second timing device; and, 6) generates an alarm signal on expiration of the ten-second timing device. The auxiliary shot clock comprises a five-second timing device, a ten-second timing device, one or more time lapse displays, and a plurality of control signals. The five-second timing device, the ten-second timing device, and the one or more time lapse displays are electrically interconnected using the plurality of control signals.

17 Claims, 3 Drawing Sheets

(Amended)

(56) References Cited

U.S. PATENT DOCUMENTS

| | | | | |
|---|---|---|---|---|
| 6,816,442 | B1 * | 11/2004 | Heiman | G04G 21/06 368/9 |
| 6,980,113 | B1 | 12/2005 | Uehran | |
| 7,277,361 | B1 * | 10/2007 | Baba | G04F 10/00 368/110 |
| 7,570,153 | B2 | 8/2009 | Gorman | |
| 7,632,198 | B2 | 12/2009 | Lee | G04F 10/00 473/472 |
| 7,889,085 | B2 * | 2/2011 | Downey | G01S 19/35 368/108 |
| 9,442,464 | B2 | 9/2016 | Singleton | |
| 10,328,328 | B2 * | 6/2019 | Benkreira | G07C 1/28 |
| 10,695,634 | B2 * | 6/2020 | Cuenin | A63B 69/0071 |
| 11,338,191 | B2 * | 5/2022 | Lewis | A63B 71/0669 |
| 2005/0240872 | A1 * | 10/2005 | Roeske | A63B 71/06 725/39 |
| 2012/0002509 | A1 * | 1/2012 | Saguin | G08C 23/02 368/3 |
| 2012/0099405 | A1 * | 4/2012 | Lidor | A63B 71/0669 368/10 |
| 2012/0230154 | A1 | 9/2012 | Woycechowsky | |
| 2016/0277812 | A1 | 9/2016 | Bokowski | |

* cited by examiner

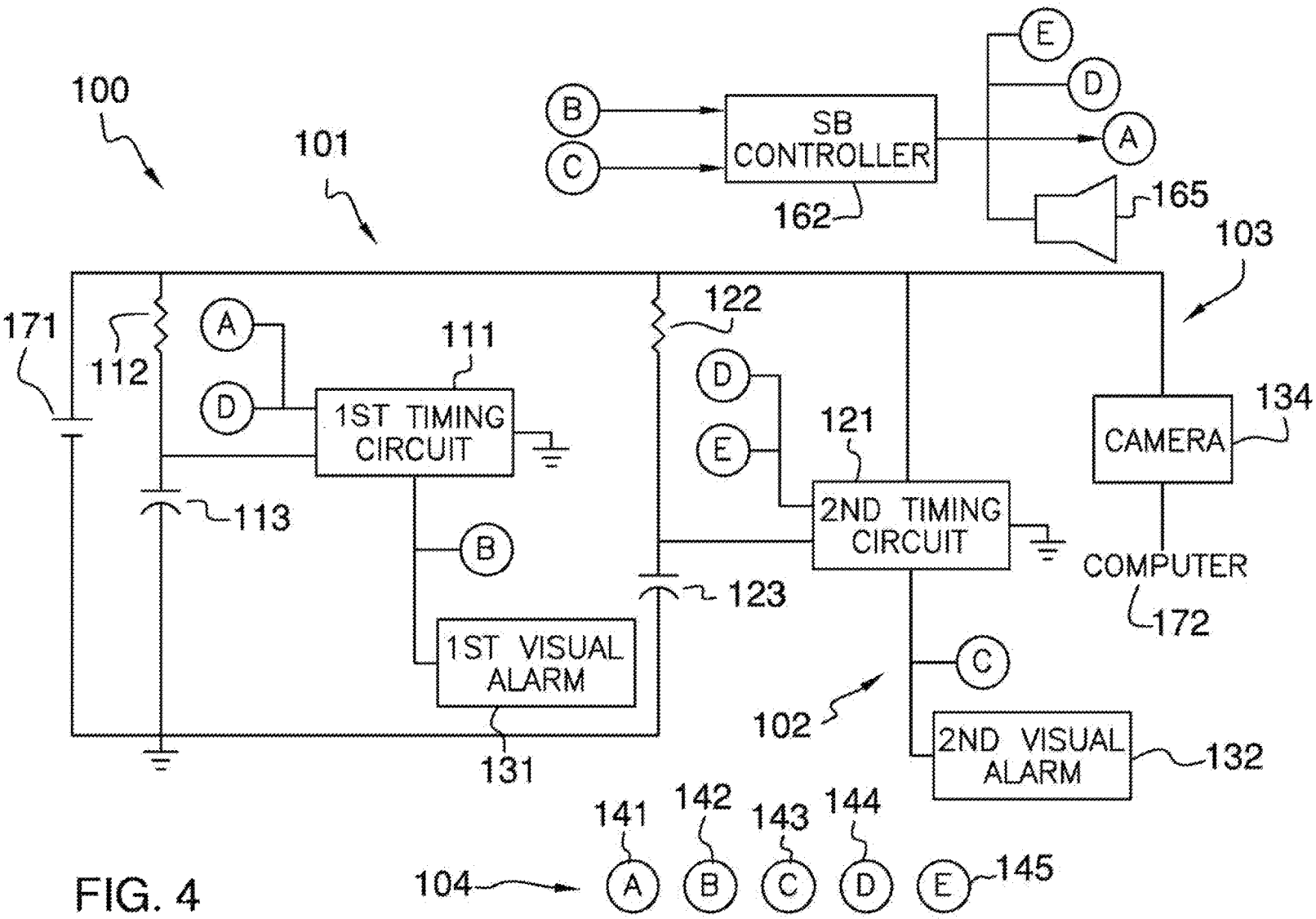
FIG. 4
(Amended)

AUXILIARY SHOT CLOCK

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCES TO RELATED APPLICATIONS

*This application is a reissue application of U.S. Pat. No. 10,099,106, issued from U.S. application Ser. No. 15/812, 066, filed on Nov. 14, 2017.*

[STATEMENT REGARDING FEDERALLY SPONSORED RESEARCH]

[Not Applicable]

[REFERENCE TO APPENDIX]

[Not Applicable]

BACKGROUND OF THE INVENTION

Field of the Invention

The present invention relates to the field of physics including instruments and horology, more specifically, a device for measuring one or more predetermined time intervals for use as a time standard.

SUMMARY OF INVENTION

The auxiliary shot clock is configured for use in a basketball game. The basketball game is further defined with one or more officials, a scoreboard. The scoreboard is further defined with a scoreboard controller, a game clock, and a shot clock. The auxiliary shot clock is configured for use with the scoreboard. The auxiliary shot clock is a supplemental timing device that: 1) operates a five-second timing device used by the one or more officials to detect a five-second violation for an inbound pass; 2) operates a ten-second timing device used by the one or more officials to detect a half court violation after an inbound pass; 3) displays the time of the five-second timing device for use by the one or more officials; 4) displays the time of the ten-second timing device for use by the one or more officials; 5) generates an alarm signal should the five-second timing device expire; and 6) generates an alarm signal should the ten-second timing device expire. The auxiliary shot clock comprises a five-second timing device, a ten-second timing device, one or more time lapse displays, and a plurality of control signals. The five-second timing device, the ten-second timing device, and the one or more time lapse displays are electrically interconnected using the plurality of control signals.

These together with additional objects, features and advantages of the auxiliary shot clock will be readily apparent to those of ordinary skill in the art upon reading the following detailed description of the presently preferred, but nonetheless illustrative, embodiments when taken in conjunction with the accompanying drawings.

In this respect, before explaining the current embodiments of the auxiliary shot clock in detail, it is to be understood that the auxiliary shot clock is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the auxiliary shot clock.

It is therefore important that the claims be regarded as including such equivalent construction insofar as they do not depart from the spirit and scope of the auxiliary shot clock. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled ion the art to practice the disclosure and are not intended to limit the scope of the appended claims.

FIG. 4 is a block diagram of an embodiment of the disclosure.

DETAILED DESCRIPTION OF THE EMBODIMENT

Figure 1:
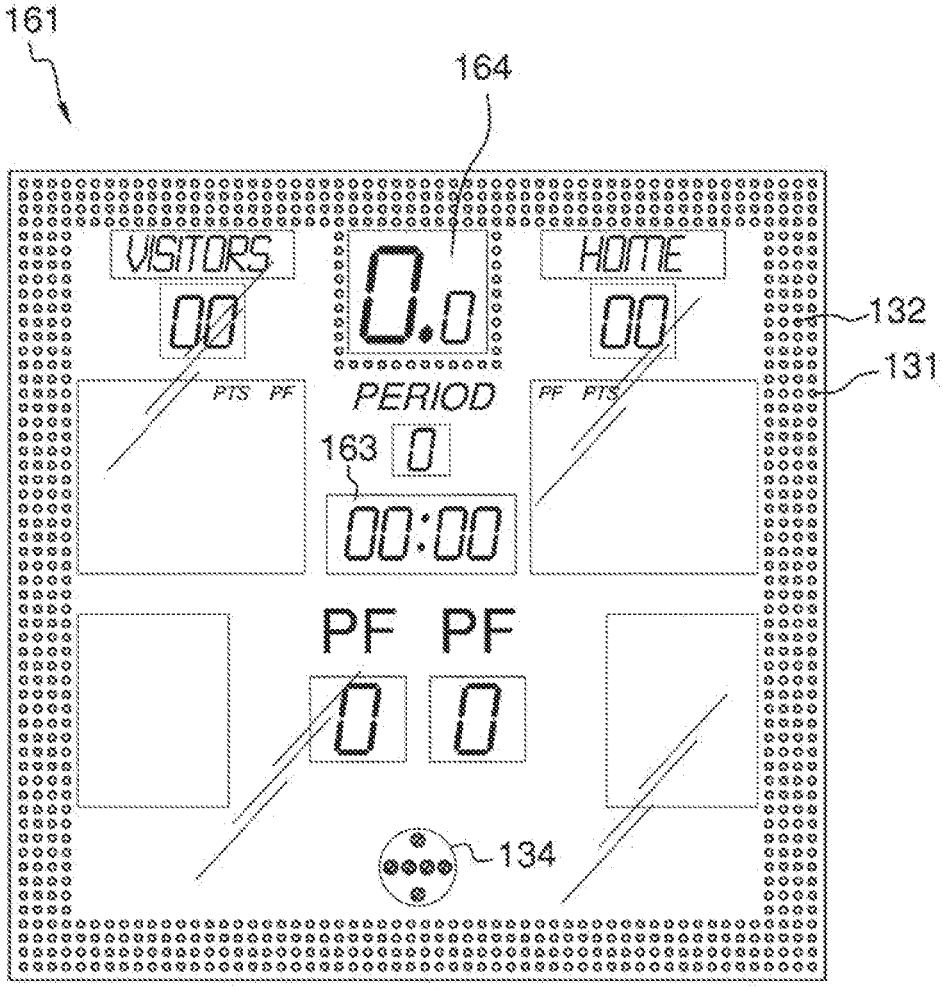
FIG. 1 is a front view of an alternate embodiment of the disclosure.
Figure 2:
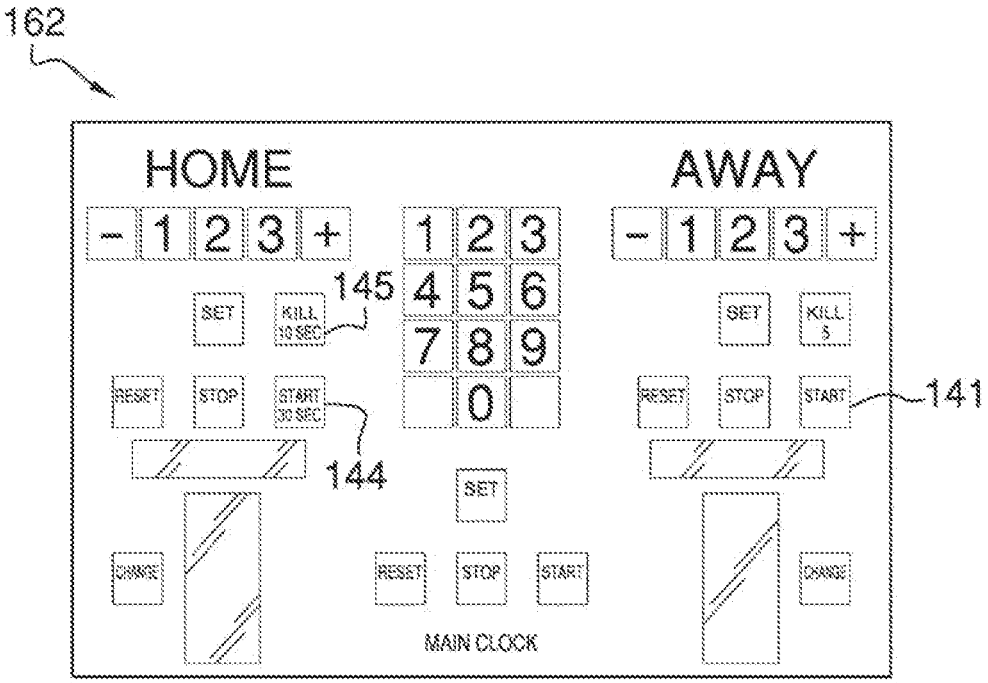
FIG. 2 is a detail view of an embodiment of the disclosure.
Figure 3:
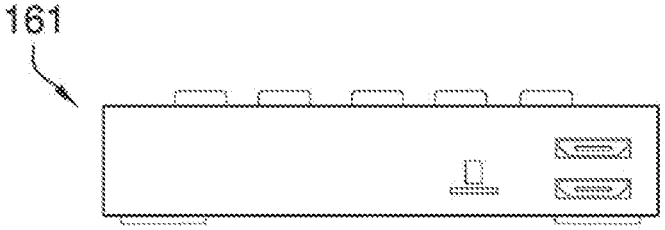
FIG. 3 is a side view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 4.

The auxiliary shot clock 100 (hereinafter invention) is configured for use in a basketball game. The basketball game is further defined with one or more officials, a scoreboard 161. The scoreboard 131 is further defined with a scoreboard 161 controller 162, a game clock 163, and a shot clock 164. The scoreboard 161 controller 162 is further defined with an audible alarm 165.

The invention 100 is configured for use with the scoreboard 161. The invention 100 is a supplemental timing device that: 1) operates a five-second timing device 101 used by the one or more officials to detect a five-second violation for an inbound pass; 2) operates a ten-second timing device 102 used by the one or more officials to detect a half court violation after an inbound pass; 3) displays the time of the five-second timing device 101 for use by the one or more officials; 4) displays the time of the ten-second timing device 102 for use by the one or more officials; 5) generates an alarm signal should the five-second timing device 101 expire; and 6) generates an alarm signal should the ten-second timing device 102 expire.

The invention 100 comprises a five-second timing device 101, a ten-second timing device 102, one or more time lapse displays 103, and a plurality of control signals 104. The five-second timing device 101, the ten-second timing device 102, the one or more time lapse displays 103, and the scoreboard 161 controller 162 are electrically interconnected using the plurality of control signals 104.

In the first potential embodiment of the disclosure, as shown in FIGS. 1 and [5,] *4* the invention 100 is presented as a device that is added to an existing and installed scoreboard 161 system. In the second potential embodiment of the disclosure, as shown most clearly in FIGS. 2, 3, *and* 4[, and 5], the invention 100 is incorporated directly into a scoreboard 161 system at the time of manufacture.

The invention 100 is further configured for use with an external power source 171. The external power source 171 is an externally provided source of electrical energy that is used to power the invention 100.

Each of the plurality of control signals 104 is an electrical connection used to coordinate the operation of the invention 100. In the first potential embodiment of the disclosure, each of the plurality of control signals 104 is presented as a voltage. The plurality of control signals 104 comprises an inbound start signal 141, a five-second violation signal 142, a ten-second violation signal 143, a shot clock 161 start signal 144, and a ten-second reset signal 145. The plurality of control signals 104 are discussed in greater detail elsewhere in this disclosure.

The five-second timing device 101 is an electrical circuit. The five-second timing device 101 is a timing circuit configured for use as a countdown timer. The five-second timing device 101 is present to count down a five-second interval. The five-second timing device 101 is initiated as the start of an inbound pass in a basketball game. If the inbound pass is completed before the expiration of the five-second timing device 101 has occurred, the five-second timing device 101 is stopped and reset by a game official. If the five-second timing device 101 expires before the five-second timing device 101 is stopped and reset, the five-second timing device 101 generates a five-second violation signal 142 as the alarm that indicates a five-second violation.

The five-second timing device 101 comprises a first timing circuit 111, a first resistor 112, and a first capacitor 113. The first timing circuit 111 receives the inbound start signal 141 and the shot clock 161 start signal 144 as inputs. The first timing circuit 111 generates the five-second violation signal 142.

The first timing circuit 111 is an electrical circuit. The first timing circuit 111 is an analog circuit. The first timing circuit 111 measures five-second intervals. In the first potential embodiment of the disclosure, the first timing circuit 111 is a commercially available timing circuit commonly referred to as a "555" circuit. Methods to design and use a "555" circuit to perform the functions of the first timing circuit 111 are well know and documented in the electrical arts.

The first resistor 112 is a commercially available two lead electrical device that is used to control the flow of electricity into the first capacitor 113. The first resistor 112 and the first capacitor 113 are connected in a series circuit. The first capacitor 113 is a commercially available two lead electrical device that is used to store an electric charge. As electric current from the first resistor 112 enters the first capacitor 113, the voltage across the first capacitor 113 increases as a function of time. The first timing circuit 111 is electrically connected to the first capacitor 113.

The time interval generated by the first timing circuit 111 is a known function lf the combination of: 1) the value in Ohms of the first resistor 112 and the value in Farads of the first capacitor 113. Stated less formally, for any given value of the first capacitor 113, the time interval counted down by the first timing circuit 111 will vary with the selected value of the first resistor 112. In the first potential embodiment of the disclosure, the time interval measured ty the first timing circuit 111, as measured in seconds, equals the product of: 1) the value of the first resistor 112 as measured in Ohms; and, 2) the value of the first capacitor 113 as measured in Farads.

The ten-second timing device 102 is a timing circuit. The ten-second timing device 102 is a timing circuit configured for use as a countdown timer. The ten-second timing device 102 is present to count down a ten-second interval. The ten-second timing device 102 is initiated after a successful inbound pass in a basketball game. If the team that completed the inbound pass clears the half court line before the expiration of the ten-second timing device 102 has occurred, the ten-second timing device 102 is stopped and reset by a game official. If the ten-second timing device 102 expires before the ten-second timing device 102 is stopped and reset, the ten-second timing device 102 generates a ten-second violation signal 143 to initiate the alarm that indicates a half court violation.

The ten-second timing device 102 comprises a second timing circuit 121, a second resistor 122, and a second capacitor 123. The second timing circuit 121 receives the shot clock 161 start signal 144 and the ten-second reset signal 145 as inputs. The second timing circuit 121 generates the ten-second violation signal 143.

The second timing circuit 121 is an electrical circuit. The second timing circuit 121 is an analog circuit. The second timing circuit 121 measures ten-second intervals. In the first potential embodiment of the disclosure, the second timing circuit 121 is a commercially available timing circuit commonly referred to as a "555" circuit. Methods to design and use a "555" circuit to perform the functions of the second timing circuit 121 are well know and documented in the electrical arts.

The second resistor 122 is a commercially available two lead electrical device that is used to control the flow of electricity into the second capacitor 123. The second resistor 122 and the second capacitor 123 are connected in a series circuit. The second capacitor 123 is a commercially available two lead electrical device that is used to store an electric charge. As electric current from the second resistor 122 enters the second capacitor 123, the voltage across the second capacitor 123 increases as a function of time. The second timing circuit 121 is electrically connected to the second capacitor 123.

The time interval generated by the second timing circuit 121 is a known function of the combination of: 1) the value in Ohms of the second resistor 122 and the value in Farads of the second capacitor 123. Stated less formally, for any given value of the second capacitor 123, the time interval counted down by the second timing circuit 121 will vary with the selected value of the second resistor 122. In the first potential embodiment of the disclosure, the time interval measured by the second timing circuit 121, as measured in seconds, equals the product of: 1) the value of the second resistor 122 as measured on Ohms; and 2) the value of the second capacitor 123 as measured in Farads.

Each of the one or more time lapse displays 103 is a visual display. Each of the one or more time lapse displays 103 attaches to an existing scoreboard 161. Each of the one or more time lapse displays 103 comprises a first visual alarm 131, a second visual alarm 132, and an image sensor 134. The one or more time lapse displays 103 receive the inbound start signal 141, the shot clock 161 start signal 144, and the ten-second reset signal 145 as inputs. The first visual alarm 131 receives the five-second violation signal 142 as a input. The second visual alarm 132 receives the ten-second violation signal 143 as an input.

The first visual alarm 131 provides a visual indication of a five-second violation. The first visual alarm 131 comprises one or more lamps mounted on each of the one or more time lapse displays 103. The first visual alarm 131 attaches in a visible manner along the perimeter of the scoreboard 161. The five-second violation signal 142 initiate the illumination of the first visual alarm 131 after the expiration of the five-second timing device 101. In the first potential embodiment of the disclosure, the first visual alarm 131 comprises a plurality of green LEDs.

The second visual alarm 132 provides a visual indication of a half court violation. The second visual alarm 132 comprises one or more lamps mounted on each of the one or more time lapse displays 103. The second visual alarm 132 attaches in a visible manner along the perimeter of the scoreboard 131. The ten-second violation signal 143 initiates the illumination of the second visual alarm 132 after the expiration of the ten-second timing device 102. In the first potential embodiment of the disclosure, the second visual alarm 132 comprises a plurality of blue LEDs.

The image sensor 134 is a light collection device that captures images of the play of the game and converts the captured signals into an electronic format. The capture and conversation into an electronic format of these images by the image sensor 134 are managed and controlled by a computer 172. The image sensor 134 mounts on the scoreboard 161 such that the playing area of the game is within the field of view of the image sensor 134. The image sensor 134 methods to integrate an image sensor 134 with a computer 172 are well-known and documented in the electrical arts.

The inbound start signal 141 is a momentary switch that is mounted on the scoreboard 161 controller 162 and is operated by a game official. The inbound start signal 141 is used to initiate the operation of the first timing circuit 111.

The five-second violation signal 142 is a signal that is generated by the first timing circuit 111 at the expiration of the countdown timer operated by the first timing circuit 111. The five-second violation signal 142 is used by the scoreboard 161 controller 162 to initiate the operation of the audible alarm 165. The five-second violation signal 142 is further used to illuminate the first visual alarm 131.

The ten-second violation signal 143 is a signal that is generated by the second timing circuit 121 at the expiration of the countdown timer operated by the second timing circuit 121. The ten-second violation signal 143 is used by the scoreboard 161 controller 162 to initiate the operation of the audible alarm 165. The ten-second violation signal 143 is further used to illuminate the second visual alarm 132.

The shot clock 161 start signal 144 is a momentary switch that is operated by a game official. The shot clock 161 start signal 144 is used by the five-second timing device 101 to stop and reset the operation of the first timing circuit 111. The shot clock 161 start signal 144 is used by the ten-second timing device 102 to initiate the operation of the second timing circuit 121.

The ten-second reset signal 145 is a momentary switch that is operated by a game official. The ten-second reset signal 145 is used by the ten-second timing device 102 to stop and reset the operation of the second timing circuit 121.

The scoreboard 161 is an electrical device that displays the current status of the basketball game. The scoreboard 161 controller 162 is an electrical device that is used to control the operation of the scoreboard 161. The game clock 163 is a display of the playing time remaining in the current quarter of the basketball game. The shot clock 164 is a display of the playing time remaining for the team with the ball to shoot the ball at the basket. The audible alarm 165 is a speaker operated by the scoreboard 161 controller 162 that generates an audible sound. The audible alarm 165 is used for multiple purposes throughout a basketball game.

The scoreboard 161 controller 162 receives the five-second violation signal 142 and the ten-second violation signal 143 as inputs. The scoreboard 161 controller 162 generates the inbound start signal 141. A game official will generate the shot clock 161 start signal 144 and the ten-second reset signal 145. This game official will typically, but not necessarily, be the game official managing the scoreboard 161.

The second potential embodiment of the disclosure is identical to the first potential embodiment od the disclosure with the following exception: 1) the five-second timing device 101, the ten-second timing device 102, the inbound start signal 141, the five-second violation signal 142, the ten-second violation signal 143, the shot clock 161 start signal 144, and the ten-second reset signal 145 is housed within the scoreboard 161 controller 162; and 2) each of the one or more time lapse displays 103 are housed within the scoreboard 161.

The following definitions were used in this disclosure:

Capacitor: As used in this disclosure, a capacitor is an electrical device that is used to store an electric charge.

Computer: As used in this disclosure, a computer is a programmable electrical device that processes externally provided inputs to generate outputs determined from a previously programmed set of instructions.

Diode: As used in this disclosure, a diode is a two terminal semiconductor device that allows current flow in only one direction. The two terminals are called the anode and the cathode. Electric current is allowed to pass from the anode to the cathode.

Display: As used in this disclosure, a display is a surface upon which is presented an image potentially including, but not limited to, graphic images and text, that is interpretable by an individual viewing the projected image in a meaningful manner.

External Power Source: As used in this disclosure, an external power source is a source of the energy that is externally provided to enable the operation of the present disclosure. Examples of external power sources include, but are not limited to, electrical power sources and compressed air sources.

Field of View: As used in this disclosure, a field of view refers to one or more angles which delimits an area from which electromagnetic radiation will be sensed by a person or an image sensor.

Image: As used in this disclosure, an image is an optical representation or reproduction of an indicia or of the appearance of something or someone.

Image Sensor: As used in this disclosure, an image sensor receives light from the exterior of the image sensor and converts the received light into a digital representation of sufficient detail to allow a logic module to create and display a visual reproduction of the source of the captured light.

Interface: As used in this disclosure, an interface is a physical or virtual boundary that separates two different systems across which information is exchanged.

LCD: As used in this disclosure, LCD is an acronym for Liquid Crystal Display. A liquid crystal display comprises a liquid crystal film placed between two sheets of transparent material. The visual characteristics of the LCD can be varied through the application of a voltage.

Lamp: As used in this disclosure, a lamp is a two terminal electrical device that generates visible light.

LED: As used in this disclosure, an LED is an acronym for a light emitting diode. A light emitting diode is a diode that is also a light source.

Perimeter: As used in this disclosure, a perimeter in one or more curved or straight lines that bounds an enclosed area on a plane or surface. The perimeter of a circle is commonly referred to as a circumference.

Resistor: As used in this disclosure, a resistor is a well-known and commonly available electrical device that inhibits the flow of electricity through an electric circuit. Within an electric circuit processing alternating currents, the resistor will not affect the phase of the alternating current. A current flowing through a resistor will create a voltage across the terminals of the resistor.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

Sentiment: As used in this disclosure, a sentiment refers to a symbolic meaning or message that is communicated through the use of an image, potentially including a text based image. Momentary Switch: As used in this disclosure, a momentary switch is a biased switch in the sense that the momentary switch has a baseline position that only changes when the momentary switch is actuated (for example when a push button switch is pushed). The momentary switch then returns to the baseline position once the actuation is completed. This baseline position is called the "normal" position. For example, a "normally open" momentary switch interrupts (open) the electric circuit in the baseline position and completes (closes) the circuit when the momentary switch is activated. Similarly, a "normally closed" momentary switch will complete (close) an electric circuit in the baseline position and interrupt (open) the circuit when the momentary switch is activated.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Timing Circuit: As used in this disclosure, a timing circuit refers to an electrical network of interconnected electrical elements, potentially including but not limited to, resistor, capacitors, diodes, transistors, and integrated circuit devices. The purpose of the timing circuit is to generate an electrical control signal after a predetermined amount of time. In common usage, a timing circuit is also referred to as timing circuitry.

Timing Device: As used in this disclosure, a timing device is an automatic mechanism for activating or deactivating a device at a specific time or after a specific period of time.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptions and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An auxiliary timing device *for use with a scoreboard having a scoreboard controller and one or more audible or visual alarms, the auxiliary timing device* comprising:

*a plurality of control signals received from one or more signal inputs, said control signals selected from one or more inbound start signals, one or more shot clock start signals, one or more five-second violation signals, one or more ten-second violation signals, one or more ten-second reset signals, or combinations thereof;*

[a] *at least one* five-second timing device *comprising a first timing circuit configured for use as a countdown timer, wherein said first timing circuit receives said inbound start signal and the shot clock start signal as inputs and wherein said first timing circuit is initiated upon the receipt of an inbound start signal; and*

[a] *at least one* ten-second timing device *comprising a second timing circuit configured for use as a countdown timer, wherein said second timing circuit receives the shot clock start signal and the ten-second reset signal as inputs wherein said second timing circuit is initiated upon the receipt a shot clock start signal, wherein the ten-second violation signal is generated by the second timing circuit at the expiration of the countdown timer operated by the second timing circuit prior to receiving the ten-second reset signal; and*

[one or more time lapse displays; and a plurality of control signals;

wherein the auxiliary timing device is configured for use in a basketball game;

wherein the basketball game is further defined with one or more officials and a scoreboard;

wherein the scoreboard is further defined with a scoreboard controller, a game clock, a shot clock, and a shot clock start signal;

wherein the scoreboard controller is further defined with an audible alarm;

wherein the auxiliary timing device is configured for use with the scoreboard;

wherein the auxiliary timing device is a supplemental timing device;]

wherein the five-second timing device, the ten-second timing device, [the one or more time lapse displays,] *the one or more audible or visual alarms,* and the scoreboard controller are electrically interconnected using *by* the plurality of control [signals;] *signals,*

[wherein the auxiliary timing device operates a five-second timing device;

wherein the auxiliary timing device operates a ten-second timing device;

wherein the auxiliary timing device generates an alarm signal should the five-second timing device expire;

wherein the auxiliary timing device generates an alarm signal should the ten-second timing device expire;

wherein the auxiliary timing device is further configured for use with an external power source;

wherein each of the one or more time lapse displays are identical;

wherein each of the one or more time lapse displays present identical images;

wherein each of the one or more time lapse displays attaches to an existing scoreboard;

wherein the one or more time lapse displays are further configured for use with a computer;

wherein the plurality of control signals comprises an inbound start signal, a five-second violation signal, a ten-second violation signal, the shot clock start signal, and a ten-second reset signal;

wherein each of the plurality of control signals is an electrical connection that coordinates the operation o f the auxiliary timing device;

wherein each of the plurality of control signals is presented as a voltage;

wherein the five-second timing device is an electrical circuit;

wherein the five-second timing device is a timing circuit configured to use as a countdown timer;

wherein the five-second timing device is present to count down a five-second interval;

wherein the ten-second timing device is an electrical circuit;

wherein the ten-second timing device a timing circuit configured for use as a countdown timer;

wherein the ten-second timing device is present to count down a ten-second interval;

wherein the five-second timing device comprises a first timing circuit, a first resistor, and a first capacitor;

wherein the first timing circuit, the first resistor, and the first capacitor are electrically interconnected;

wherein the first timing circuit receives the inbound start signal and the shot clock start signal as inputs;

wherein the first timing circuit generates the five-second violation signal;

wherein the first timing circuit is an electrical circuit;

wherein the first timing circuit is an analog circuit;

wherein the first timing circuit measures five-second intervals;

wherein the value of the first resistor is measured in Ohms;

wherein the value of the first capacitor is measured in Farads;

wherein the first capacitor is a two lead electrical device that stores an electric charge;

wherein the first resistor and the first capacitor are connected in a series circuit;

wherein the first timing circuit is electrically connected to the first capacitor;

wherein the time interval generated by the first timing circuit is a known function of the combination the value in Ohms of the first resistor and the value in Farads of the first capacitor;

wherein the ten-second timing device comprises a second timing circuit, a second resistor, and a second capacitor;

wherein the second timing circuit, the second resistor, and the second capacitor are electrically interconnected;

wherein the second timing circuit receives the shot clock start signal and the ten-second reset signal as inputs;

wherein the second timing circuit generates the ten-second violation signal;

wherein the second timing circuit is an electrical circuit;

wherein the second timing circuit is an analog circuit;

wherein the second timing circuit measures ten-second intervals;

wherein the value of the second resistor is measured on Ohms;

wherein the value of the second capacitor is measured in Farads;

wherein the second capacitor is a two lead electrical device that store an electric charge;

wherein the second resistor and the second capacitor are connected in a series circuit;

wherein the second timing circuit is electrically connected to the second capacitor;

wherein the time interval generated by the second timing circuit is a known function of the combination the value in Ohms or the second resistor and the value in Farads of the second capacitor;

wherein each of the one or more time lapse displays comprises a first visual alarm, a second visual alarm, and an image sensor;

wherein the first visual alarm, the second visual alarm, and the image sensor attach to the scoreboard;

wherein the one or more time lapse displays receive the inbound start signal, the shot clock start signal, and the ten-second reset signal as inputs;

wherein the first visual alarm receives the five-second violation signal as an input;

wherein the second visual alarm receives the ten-second violation signal as an input].

[2. The auxiliary timing device according to claim 1 wherein the first visual alarm comprise one or more lamps mounted on each of the one or more time lapse displays;

wherein the first visual alarm provides a visual indication the five-second violation signal;

wherein the first visual alarm attaches in a visible manner along the perimeter of the scoreboard;

wherein the second visual alarm comprises one or more lamps mounted on each of the one or more time lapse displays;

wherein the second visual alarm provide a visual indication of the ten-second violation signal;

wherein the second visual alarm attached in a visible manner along the perimeter of the scoreboard.]

[3. The auxiliary timing device according to claim 2 wherein the image sensor is a light collection device that captures images of the basketball game and converts the capture signals into an electronic format;

wherein the image sensor mounts on the scoreboard such that the playing area of the game is within the field of view of the image sensor;

wherein the capture and conversion into an electronic format of these images by the image sensor are managed and controlled by the computer.]

[4. The auxiliary timing device according to claim 3 wherein the inbound start signal is a momentary witch;

wherein the inbound start signal is manually generated;

wherein the inbound start signal indicates the operation of the first timing circuit.]

5. The auxiliary timing device according to claim [4] *1* wherein the five-second violation signal is generated by the first timing circuit at the expiration of the countdown timer operated by the first timing circuit [wherein the five-second violation signal illuminates the first visual alarm; wherein the five-second violation signal initiates the operation of the audible alarm] *prior to receiving the shot clock start signal.*

[6. The auxiliary timing device according to claim 5
wherein the ten-second violation signal is generated by the second timing circuit at the expiration of the countdown timer operated by the second timing circuit;
wherein the ten-second violation signal initiates the operation of the audible alarm;
wherein the ten-second violation signal illuminates the second visual alarm.]

[7. The auxiliary timing device according to claim 6
wherein the shot clock start signal is a momentary switch;
wherein the shot clock start signal is manually operated;
wherein the shot clock start signal stops and resets the operation of the first timing circuit;
wherein the shot clock start signal initiates the operation of the second timing circuit.]

[8. The auxiliary timing device according to claim 7
wherein the ten-second reset signal is a momentary switch;
wherein the ten-second reset signal is manually operated;
wherein the ten-second reset signal stops and resets the operation of the second timing circuit.]

[9. The auxiliary timing device according to claim 8
wherein the first visual alarm comprises a plurality of green LEDs;
wherein the second visual alarm comprises a plurality of blue LEDs.]

*10. The auxiliary timing device according to claim 1 wherein said one or more inbound start signals, one or more shot clock start signals, or one or more ten-second reset signals are generated by the scoreboard controller.*

*11. The auxiliary timing device according to claim 10 wherein said one or more inbound start signals, one or more shot clock start signals, or one or more ten-second reset signals generated by the scoreboard controller are initiated manually.*

*12. The auxiliary timing device according to claim 10 wherein said one or more inbound start signals, one or more shot clock start signals, or one or more ten-second reset signals generated by the scoreboard controller are initiated by a computer.*

*13. The auxiliary timing device according to claim 5 wherein the auxiliary timing device generates one or more audible or visual alarms upon receipt of said one or more five-second violation signal.*

*14. The auxiliary timing device according to claim 1 wherein the auxiliary timing device generates one or more audible or visual alarms upon receipt of said one or more ten-second violation signal.*

*15. A method for providing an audible or visible indication of a five second and ten second interval to be implemented with a basketball scoreboard, the method comprising:*

*providing a scoreboard controller for generating one or more control signals selected from one or more inbound start signals, one or more shot clock start signals, one or more five-second violation signals, one or more ten-second violation signals, one or more ten-second reset signals, or combinations thereof;*

*initiating at least one five-second timing device comprising a first timing circuit configured for use as a countdown timer upon the receipt of an inbound start signal;*

*initiating at least one ten-second timing device comprising a second timing circuit configured for use as a countdown timer upon receipt of the shot clock start signal;*

*initiating one or more five-second violation signals if said countdown timer of said five-second timing device completes the countdown operation prior to receiving said one or more shot clock start signals;*

*initiating one or more ten-second violation signals if said countdown timer of said ten-second timing device completes the countdown operation prior to receiving said one or more ten-second reset signals;*

*resetting said countdown timer of said five-second timing device upon receipt of said one or more shot clock start signals prior to the completion of the countdown timer; and*

*resetting said countdown timer of said ten-second timing device upon receipt of said one or more ten-second reset signals prior to the completion of the countdown timer.*

*16. The method of claim 15 further comprising initiating one or more audible or visual alarms upon receipt of one or more five-second violation signals or one or more ten-second violation signals.*

*17. A scoreboard comprising:*

*one or more game clock;*

*one or more shot clock;*

*a scoreboard controller for controlling said one or more game clock and one or more shot clock, said scoreboard further generating and communicating one or more control signals selected from one or more inbound start signals, one or more shot clock start signals, one or more ten-second reset signals, or combinations thereof;*

*one or more audible or visual alarms; and*

*one or more auxiliary timing device comprising:*

*at least one five-second timing device comprising a first timing circuit configured for use as a countdown timer, wherein said first timing circuit receives said inbound start signal and the shot clock start signal as inputs and wherein said first timing circuit is initiated upon the receipt of an inbound start signal; and*

*at least one ten-second timing device comprising a second timing circuit configured for use as a countdown timer, wherein said second timing circuit receives the shot clock start signal and the ten-second reset signal as inputs wherein said second timing circuit is initiated upon the receipt of a shot clock start signal, and wherein the ten-second violation signal is generated by the second timing circuit at the expiration of the countdown timer operated by the second timing circuit prior to receiving the ten-second reset signal.*

*18. The scoreboard according to claim 17 wherein at least one five-second violation signal is generated by the first timing circuit at the expiration of the countdown timer operated by the first timing circuit prior to receiving the shot clock start signal.*

*19. The scoreboard according to claim 17 wherein said one or more inbound start signals, one or more shot clock start signals, or one or more ten-second reset signals are generated by the scoreboard controller.*

*20. The scoreboard according to claim 19 wherein said one or more inbound start signals, one or more shot clock start signals, or one or more ten-second reset signals generated by the scoreboard controller are initiated manually.*

*21. The scoreboard according to claim 19 wherein said one or more inbound start signals, one or more shot clock start signals, or one or more ten-second reset signals generated by the scoreboard controller are initiated by a computer.*

*22. The scoreboard according to claim 18 wherein the auxiliary timing device generates one or more audible or visual alarms upon receipt of said one or more five-second violation signal.*

*23. The scoreboard according to claim 17 wherein the auxiliary timing device generates one or more audible or visual alarms upon receipt of said one or more ten-second violation signal.*

*24. The scoreboard according to claim 17 further comprising one or more time lapse displays for displaying the status of any of the shot clock, the game clock, the five-second timing device, the ten-second timing device, or combinations thereof.*

* * * * *